V. W. NORTHRUP & M. H. MELLOTT.
SELF LUBRICATING WHEEL.
APPLICATION FILED MAR. 29, 1910.
990,583.
Patented Apr. 25, 1911.
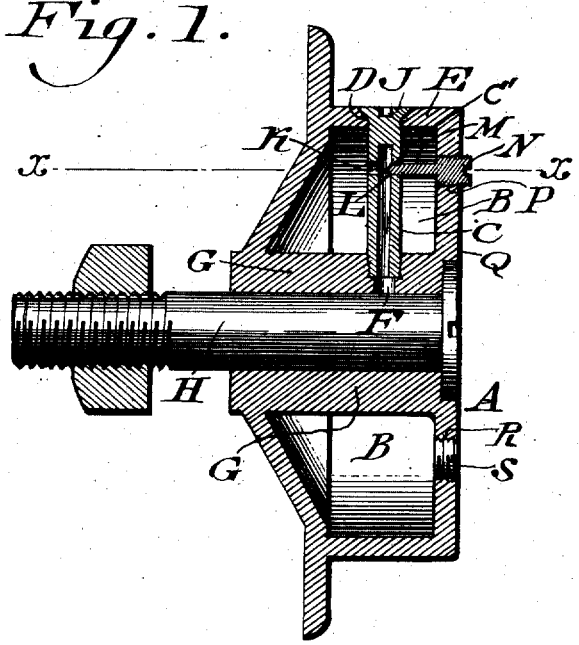
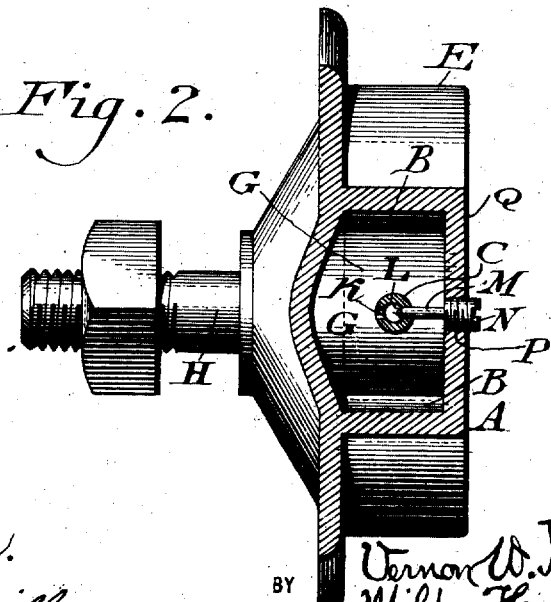
WITNESSES
P. F. Nagle
L. Douville
INVENTORS
Vernon W. Northrup
Milton H. Mellott
BY Wiederheim & Fairbault
ATTORNEYS

UNITED STATES PATENT OFFICE.

VERNON W. NORTHRUP AND MILTON H. MELLOTT, OF HURLOCK, MARYLAND.

SELF-LUBRICATING WHEEL.

990,583. Specification of Letters Patent. Patented Apr. 25, 1911.

Application filed March 29, 1910. Serial No. 552,226.

*To all whom it may concern:*

Be it known that we, VERNON W. NORTHRUP and MILTON H. MELLOTT, both citizens of the United States, and residents of Hurlock, county of Dorchester, State of Maryland, have invented a new and useful Self-Lubricating Wheel, of which the following is a specification.

Our invention consists of a self lubricating or oiling wheel, pulley, sheave, or a like rotatable device, the body of which is hollow and contains a conduit which leads to the axle of the device, and so lubricates or oils the wheel and axle at intervals uniformly and without waste, provision being made for regulating the feed of the lubricant to said conduit, and consequently to the axle.

For the purpose of explaining the invention, the accompanying drawing illustrates a satisfactory reduction of the same to practice, but changes within the scope of the claims may be made without departing from the spirit of the invention.

Figure 1 represents a diametrical section of a self lubricating wheel embodying our invention. Fig. 2 represents a section on line $x$—$x$ Fig. 1.

Similar letters of reference indicate corresponding parts in the figures.

Referring to the drawings:—A designates a wheel whose body is hollow forming the lubricant chamber B, the peripheral wall, side wall and hub forming said body being cast whole or otherwise made integral. C designates a lubricant feeding tube which is passed through an opening D in the periphery E of the wheel and has its inner end threaded for engagement with the wall of a duct F which is formed in the hub G of the wheel, said duct opening into the bore of the hub to the axle or shaft H on which the wheel revolves.

The head J of the tube rests on the wall of the opening D, which is countersunk, so as to close said opening and provide a tight joint for said head.

In the side of the tube C is a port K which leads into the opening or bore of said tube and forms a communication for the same with the chamber B. In said tube opposite to said port K is an opening C′ which freely receives the stem M of the valve L, which stem passes through the chamber B to the threaded plug or head N, which is fitted in a threaded opening P in the side Q of the wheel, said plug constituting the head of the stem M and serving to close the opening P, it being noticed that the stem M is supported on its opposite ends by the plug N and the wall of the opening C′ in the tube C and so adapted to be firmly sustained and cause the valve to move true in opening and closing the latter being occasioned by the operation of said threaded plug N, which is accessible from the exterior of the wheel so as to move the valve L whereby the port K which serves as the seat of said valve may be uncovered more or less to regulate the quantity of lubricant admitted into the tube C, and consequently fed to the axle H, it being seen that when the chamber B is supplied with lubricant, the valve is properly set, and the wheel rotated, the lubricant enters the port K and the tube C, and when the tube C is above the center, the lubricant flows down the same, whereby it is conveyed to the duct F and so fed to the axle H, whereby the latter and the wheel will be lubricated at intervals uniformly and without waste.

In the side of the wheel, pulley, sheave, etc., is a threaded opening R which is adapted for filling or supplying the chamber B with lubricant, the same being adapted to have the screw plug S fitted therein, so as to close said opening and consequently said chamber, the effect of which is evident.

The radial conduit tube C may easily be removed for cleaning or repair by loosening the transverse valve-plug N, and then unscrewing the tube, and said plug locks the tube in place against rotation and consequent displacement when screwed into its transverse hole in the tube.

Having thus described our invention what we claim as new and desire to secure by Letters Patent, is:—

1. A wheel having a body composed of sides, periphery and a hub forming a supply chamber therein, said periphery having an opening therein and the hub having a duct, an oil feeding tube in said chamber in communication with said duct, said tube having a head seated on the outer wall of said opening and its inner end secured to the wall of said duct, said tube being provided with a port and a valve seat in its side, and means on the body adapted to engage said tube and lock the same against radial displacement and to serve as a valve.

2. A wheel having a body composed of sides, periphery and a hub forming a supply chamber therein, said periphery having an opening therein and the hub having a duct, an oil feeding tube in said chamber in communication with said duct, said tube having a head seated on the outer wall of said opening and its inner end secured to the wall of said duct, said tube being provided with a port and a valve seat in its side, a valve for said seat, and a stem carrying said valve, said stem having its outer end movably mounted in the side of said body and its inner end movably mounted in said tube, said stem thus being doubly supported.

3. A wheel having a body composed of sides, periphery, and a hub forming a supply chamber therein, said periphery having an opening therein and the hub having a duct, an oil feeding tube in said chamber in communication with said duct, said tube having a head seated on the outer wall of said opening and its inner end secured to the wall of said duct, said tube being provided with a port and a valve seat in its side, a valve for said seat, and a stem carrying said valve, the head of said valve being screw-threaded and engaging a threaded opening in the side of the body and its inner end adapted to enter said tube opposite to said valve seat and lock the tube, preventing change of adjustment and displacement of the same.

VERNON W. NORTHRUP.
MILTON H. MELLOTT.

Witnesses:
ALEX. NOBLE,
WILLIAM A. LOCKER, Jr.

Copies of this patent may be obtained for five cents each, by addressing the "Commissioner of Patents, Washington, D. C."